US011073396B2

(12) United States Patent
Yang et al.

(10) Patent No.: US 11,073,396 B2
(45) Date of Patent: Jul. 27, 2021

(54) INTEGRATED POSITIONING METHOD AND SYSTEM

(71) Applicant: BAIDU ONLINE NETWORK TECHNOLOGY (BEIJING) CO., LTD., Beijing (CN)

(72) Inventors: Xiaolong Yang, Beijing (CN); Renlan Cai, Beijing (CN); Shiyu Song, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 322 days.

(21) Appl. No.: 16/179,460

(22) Filed: Nov. 2, 2018

(65) Prior Publication Data

US 2019/0145776 A1 May 16, 2019

(30) Foreign Application Priority Data

Nov. 15, 2017 (CN) .......................... 201711128937.7

(51) Int. Cl.
*G01C 21/20* (2006.01)
*G01C 21/00* (2006.01)
*G01C 21/16* (2006.01)

(52) U.S. Cl.
CPC ......... *G01C 21/005* (2013.01); *G01C 21/165* (2013.01); *G01C 21/20* (2013.01)

(58) Field of Classification Search
CPC .... G01C 21/005; G01C 21/165; G01C 21/20; G01C 21/26
See application file for complete search history.

(56) References Cited

U.S. PATENT DOCUMENTS

| 6,516,021 B1* | 2/2003 | Abbott | ..................... G01S 19/26 342/108 |
| 7,328,104 B2* | 2/2008 | Overstreet | .............. G01S 19/47 244/3.2 |
| 2016/0040992 A1* | 2/2016 | Palella | ..................... G01C 5/06 702/152 |

FOREIGN PATENT DOCUMENTS

| CN | 101895466 A | 11/2010 |
| CN | 104075713 A | 10/2014 |

(Continued)

OTHER PUBLICATIONS

First Office Action and Search Report from CN app. No. 201711128937.7, dated Jul. 30, 2019, with English translation from Global Dossier.

(Continued)

*Primary Examiner* — Mohamed Charioui
(74) *Attorney, Agent, or Firm* — Ladas & Parry, LLP (57) ABSTRACT

The present disclosure provides an integrated positioning method and system. The method comprises: receiving IMU data, and solving for the IMU data in a first Kalman filter to obtain a system state variable of an autonomous vehicle; receiving and buffering measurement data, and regarding the measurement data as current measurement data; performing measurement updating: obtaining the system state variable at a measurement time of current measurement data, and solving in the second Kalman filter to obtain an updated system state variable; if measurement data after the measurement time of the measurement data is already buffered, regarding the already-buffered measurement data after the measurement time as current measurement data, and performing the measurement update. The present disclosure can solve the problem about measurement information disorder caused by inconsistency of time delay in solving between different sensors, and improve real time and accuracy of the positioning.

17 Claims, 2 Drawing Sheets

(56) References Cited

FOREIGN PATENT DOCUMENTS

CN           105607603 A     5/2016
WO    WO-2018106311 A2 *  6/2018  ........... G01C 21/165

OTHER PUBLICATIONS

Yang et al., "A Suboptimal Recursive Filter for Out-of-Sequence Measurements", Acta Electronica Sinica, vol. 32, No. 6, Jun. 2004, pp. 960-964.

* cited by examiner

INTEGRATED POSITIONING METHOD AND SYSTEM

The present application claims the priority of Chinese Patent Application No. 201711128937.7, filed on Nov. 15, 2017, with the title of "Integrated positioning method and system". The disclosure of the above application is incorporated herein by reference in its entirety.

FIELD OF THE DISCLOSURE

The present disclosure relates to the field of automatic control, and particularly to an integrated positioning method and system.

BACKGROUND OF THE DISCLOSURE

An autonomous vehicle needs to perform real-time control according to its current location and ambient environment during running. This requires a positioning system of the autonomous vehicle to provide current location information in real time.

Sensors used by the autonomous vehicle for positioning usually include SINS (Strapdown Inertial Navigation System) (e.g., inertial sensor IMU), GNSS (Global Navigation Satellite System, LiDAR laser radar, and so on, wherein GNSS and LiDAR sensors usually take 10-20 ms from collecting measurement information to solving and obtaining the position information, and have a delay of 80-100 ms. Inconsistency of delay causes presence of disorder in the measurement information received in fusion filter.

In a case with lower real-time requirements, real time of the positioning usually needn't be considered. When integrated positioned is studied in most documentations and research, a SINS is usually integrated with a GNSS and a tachometer, and meanwhile, no thoughts are given to problems such as the disorder caused by inconsistency of delay between different systems.

However, the autonomous vehicle raises very high requirements for real-time performance, so how to integrate data of sensors of for example SINS, GNSS and LiDAR and obtain real-time positioning information plays an important role in autonomous driving.

SUMMARY OF THE DISCLOSURE

A plurality of aspects of the present disclosure provide a integrated positioning method and system, to solve the problem that the measurement information is disordered, and improve real time and accuracy of the positioning.

According to an aspect of the present disclosure, there is provided a integrated positioning method, comprising:

receiving IMU data, and solving for the IMU data in a first Kalman filter to obtain a system state variable of an autonomous vehicle;

receiving and buffering measurement data, and regarding the measurement data as current measurement data; performing measurement updating: obtaining the system state variable at a measurement time of current measurement data, and solving in the second Kalman filter to obtain an updated system state variable;

if measurement data after the measurement time of the measurement data is already buffered, regarding the already-buffered measurement data after the measurement time as current measurement data, and performing the measurement update.

The abovementioned aspect and any possible implementation mode further provide an implementation mode: the receiving IMU data, and solving for the IMU data in a first Kalman filter to obtain a system state variable of an autonomous vehicle comprises:

receiving the IMU data, and solving for the IMU data in the first Kalman filter to obtain a system state variable and an error state variable of the autonomous vehicle; storing in a buffer the IMU data and the system state variable of the autonomous vehicle obtained from the solving.

The abovementioned aspect and any possible implementation mode further provide an implementation mode: the performing the measurement update comprises:

performing time update, assigning an error state variable in the first Kalman filter to the second Kalman filter, and obtaining, from the buffer of the first Kalman filter, the system state variable at the measurement time of the current measurement data;

performing measurement update, comprising: calculating an error state variable of the second Kalman filter to correct the system state variable, according to the current measurement data, and the system state variable and error state variable obtained by the first Kaman filter's solving.

The abovementioned aspect and any possible implementation mode further provide an implementation mode: if measurement data after the measurement time of the measurement data is already buffered, regarding the already-buffered measurement data after the measurement time as current measurement data, and performing the measurement update comprises:

performing time update for the second Kalman filter until a measurement time of measurement data after the measurement time of the measurement data, and performing measurement update.

The abovementioned aspect and any possible implementation mode further provide an implementation mode: the performing time update for the second Kalman filter until a measurement time of measurement data after the measurement time of the measurement data, and performing measurement update further comprises:

if there are a plurality of measurement data, performing time update and measurement update for the second Kalman filter in turn, until a time of latest IMU data.

The abovementioned aspect and any possible implementation mode further provide an implementation mode: after step of, if measurement data after the measurement time of the measurement data is already buffered, regarding the already-buffered measurement data after the measurement time as current measurement data, and performing the measurement update, the method further comprises:

performing time update for the second Kalman filter until a time of latest IMU data, and assigning the error state variable in the second Kalman filter to the first Kalman filter.

The abovementioned aspect and any possible implementation mode further provide an implementation mode: the measurement data is GNSS or LiDAR measurement data.

According to another aspect of the present disclosure, there is provided an integrated positioning system, comprising:

a first Kalman filter solving module configured to receive IMU data, and solve for the IMU data in the first Kalman filter to obtain a system state variable of an autonomous vehicle;

a second Kalman filter solving module configured to receive and buffer measurement data, and regard the measurement data as current measurement data; perform measurement updating: obtain the system state variable at a measurement time of current measurement data, and solve in the second Kalman filter to obtain an updated system state variable;

if measurement data after the measurement time of the measurement data is already buffered, regard the already-buffered measurement data after the measurement time as current measurement data, and perform the measurement update.

The abovementioned aspect and any possible implementation mode further provide an implementation mode: the first Kalman filter solving module is specifically configured to:

receive the IMU data, and solve for the IMU data in the first Kalman filter to obtain a system state variable and an error state variable of the autonomous vehicle; store in a buffer the IMU data and the system state variable of the autonomous vehicle obtained from the solving.

The abovementioned aspect and any possible implementation mode further provide an implementation mode: the second Kalman filter solving module comprises:

a time updating submodule configured to perform time update, assign an error state variable in the first Kalman filter to the second Kalman filter, and obtain, from the buffer of the first Kalman filter, the system state variable at the measurement time of the current measurement data;

a measurement updating submodule configured to perform measurement update, and calculate an error state variable of the second Kalman filter to correct the system state variable, according to the current measurement data, and the system state variable and error state variable obtained by the first Kaman filter's solving.

The abovementioned aspect and any possible implementation mode further provide an implementation mode: if measurement data after the measurement time of the measurement data is already buffered, regarding the already-buffered measurement data after the measurement time as current measurement data, and performing the measurement update comprises:

the time updating submodule performs time update for the second Kalman filter until a measurement time of measurement data after the measurement time of the measurement data, and the measurement updating submodule performs measurement update.

The abovementioned aspect and any possible implementation mode further provide an implementation mode: the performing time update for the second Kalman filter until a measurement time of measurement data after the measurement time of the measurement data, and performing measurement update further comprises:

if there are a plurality of measurement data, performing time update and measurement update for the second Kalman filter in turn, until a time of latest IMU data.

The abovementioned aspect and any possible implementation mode further provide an implementation mode: after the time updating submodule performs time update for the second Kalman filter until a measurement time of measurement data after the measurement time of the measurement data, and the measurement updating submodule performs measurement update, the time updating submodule performs time update for the second Kalman filter until a time of latest IMU data, and assigns the error state variable in the second Kalman filter to the first Kalman filter.

The abovementioned aspect and any possible implementation mode further provide an implementation mode: the measurement data is GNSS or LiDAR measurement data.

A further aspect of the present disclosure provides a computer device, comprising a memory, a processor and a computer program which is stored on the memory and runnable on the processor, wherein the processor, upon executing the program, implements the above-mentioned method.

A further aspect of the present disclosure provides a computer-readable storage medium on which a computer program is stored, wherein the program, when executed by a processor, implements the aforesaid method.

As known from the technical solutions, embodiments of the present disclosure may solve the problem that the measurement information is disordered, and improve real time and accuracy of the positioning.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

An example system architecture that may use an embodiment of an integrated positioning method or integrated positioning system of the present disclosure may include an autonomous vehicle, a network and a server. The network is used to provide a medium of a communication link between the autonomous vehicle and the server and may include various connection types such as wired and wireless communication links.

The autonomous vehicle may interact with the server through the network to receive a transmitted message. The autonomous vehicle may be mounted with a LiDAR laser radar, an inertial navigation system, a GNSS positioning device and a communication device.

The server may be a server providing various services, for example, a server that performs processing for laser point cloud reflection value data and height value data collected by the autonomous vehicle, and feeds a processing result (e.g., positioning information of the autonomous vehicle) back to the server of the autonomous vehicle.

It needs to be appreciated that the integrated positioning method according to the embodiment of the present application may be executed by the autonomous vehicle, or by the server, or partial steps are executed by the autonomous vehicle and remaining steps are executed by the server. Correspondingly, the integrated positioning system may be disposed in the server, or in the autonomous vehicle, or partial modules are disposed in the server and remaining modules are disposed in the autonomous vehicle.

Figure 1:
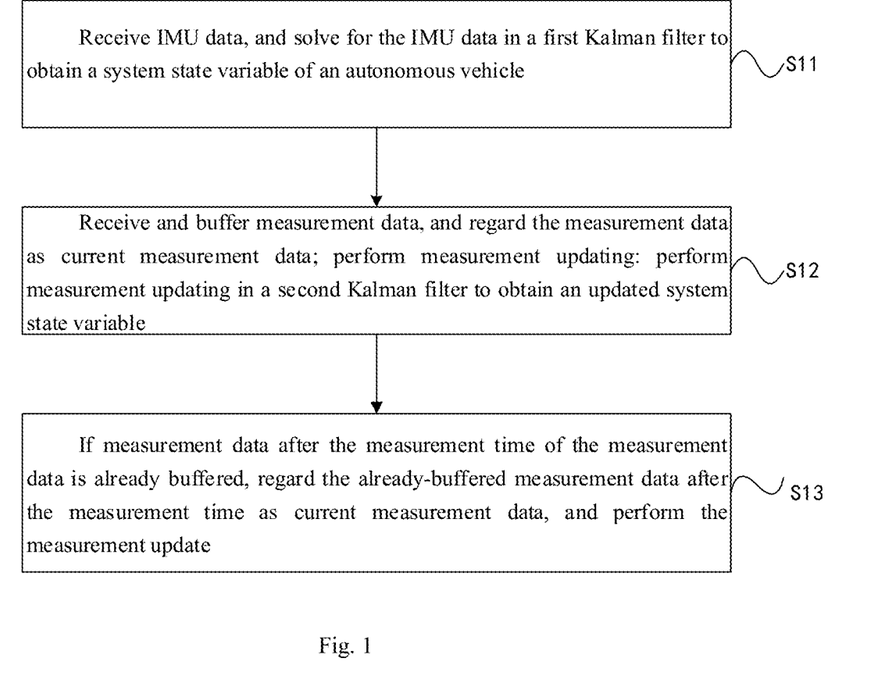
FIG. 1 is a flow chart of an integrated positioning method according to an embodiment of the present disclosure.

FIG. 1 is a flow chart of an integrated positioning method according to an embodiment of the present disclosure. As shown in FIG. 1, the method comprises the following steps:

Step S11: receiving IMU data, and solving for the IMU data in a first Kalman filter to obtain a system state variable of the autonomous vehicle;

Step S12: receiving and buffering measurement data, and regarding the measurement data as current measurement data; performing measurement updating: obtaining the system state variable at measurement time of the current measurement data, and solving in a second Kalman filter to obtain an updated system state variable;

Step S13: if measurement data after the measurement time of the measurement data is already buffered, regarding the already-buffered measurement data after the measurement time as current measurement data, and performing the measurement update.

In a preferred implementation mode of step S11, receiving the IMU data which includes output data of an accelerator and a gyro, and solving for the IMU data in the first Kalman filter in real time to obtain a system state variable and an error state variable of the autonomous vehicle; storing in a buffer the IMU data and the system state variable of the autonomous vehicle obtained from the solving.

The system state variable comprises a location r, a velocity $v^n$ and a posture quaternion $q_b^n$.

Preferably, it is feasible to use the following differential equations of the SINS (Strapdown Inertial Navigation System) to solve in real time to obtain the location, velocity and posture quaternion of the autonomous vehicle:

$$\dot{r} = R_c v \quad (1)$$

$$\dot{v}_{en}^n = C_b^n f^b - (2\omega_{ie}^n + \omega_{en}^n) \times v_{en}^n + g^n \quad (2)$$

$$\dot{q}_b^n = 0.5 * \dot{q}_b^n (\omega_{nb}^b \times) \quad (3)$$

where $r = (\lambda, L, a)^T$, is location information of the autonomous vehicle, and includes longitude $\lambda$, latitude L and height a;

$$R_c = \begin{bmatrix} \dfrac{1}{(R_n + a)\cos(L)} & \dfrac{1}{R_m + a} & 1 \end{bmatrix},$$

convert a distance of velocity integration into the longitude $\lambda$, latitude L and height a, and $R_m$ and $R_n$ are a radius of a meridian and a radius of a prime vertical of the globe; $C_b^n$ is a posture matrix, namely, a rotation matrix from a carrier coordinate system to a navigation coordinate system; $\omega_{ie}^n$ is a projection of an earth rotation angular velocity on the navigation coordinate system; $\omega_{en}^n$ is a projection of rotation of the navigation coordinate system relative to the earch coordinate system on the navigation coordinate system; $f^b$ is a specific force measured by the accelerator in the IMU; $g^n$ is a projection of a gravational acceleration on the naviga­tion coordinate system; $\omega_{nb}^b = \omega_{ib}^b - C_n^b(\omega_{ie}^n + \omega_{en}^n)$ is a pro­jection of rotation of the carrier coordinate system relative to the navigation coordinate system on the carrier coordinate system; $\omega_{ib}^b$ is an angular velocity output by the gyro in the IMU.

Meanwhile, using equations (4) and (5) in the first Kal­man filter to estimate the error state variable includes a prediction value of the state variable and a covariance of the state variable:

$$\delta \dot{X}_{k,k-1} = F_{k,k-1} \delta X_{k-1} \quad (4)$$

$$P_{k-1,k} = F_{k,k-1} P_{k-1} F_{k,k-1}^T + G_k Q_k G_k^T \quad (5)$$

where $F_{k,k+1}$ is a state transfer matrix of a discrete error state variable $\delta X_k$, and obtained by performing discretization via an error equation of the SINS, and will not be detailed any more here; $\delta X_{k,k-1}$ is a prediction value of the error state variable; $P_{k-1}$ is a covariance matrix of the error state variable $\delta X_{k-1}$; $P_{k-1,k}$ is a prediction value of the covariance; $G_k$ is a noise drive matrix; $Q_k$ is a system noise (including accelerator noise, gyro noise, accelerator zero bias noise, gyro zero bias noise) covariance matrix; when currently no measurement data are subjected to measurement updating, $\delta X_k = \delta X_{k,k-1}$ and $P_k = P_{k-1,k}$.

The IMU data and the system state variable are stored in the buffer of the first Kalman filter, and the buffer has a fixed length which for example may be set as 2s.

Preferably, the above calculation process consumes less than 1 ms. Assuming that a data refresh frequency of the IMU is 200 Hz, a data refresh frequency of the GNSS is 5 Hz, and a data refresh frequency of the LiDAR is 10 Hz, it is possible to obtain GNSS data update twice and IMU data update 20 times between every two times of LiDAR mea­surement data update.

In a preferred implementation mode of step S12, receiving first measurement data output by the LiDAR; storing the first measurement data output by the LiDAR in a buffer of a second Kalman filter;

performing time update, comprising: assigning an error state variable in the first Kalman filter to the second Kalman filter, and obtaining, from the buffer of the first Kalman filter, a system state variable at measurement time of the first measurement data;

performing measurement update, comprising: according to the first measurement data output by the LiDAR, the system state variable and error state variable obtained by the first Kaman filter's solving, calculating an error state vari­able of the second Kalman filter to correct the system state variable.

For example, if the measurement time of the first mea­surement data is t1, it is feasible to assign the error variable estimated by the first Kalman filter to the second Kalman filter, obtain the system state variable at t1 from the buffer of the first Kalman filter, and perform measurement update by regarding the first measurement data and the system state variable at t1 obtained from the buffer of the first Kalman filter as measurement information of the second Kalman filter.

Measurement equations at this time are as follows:

$$K_k = P_{k-1,k} H_L (H_L P_{k-1,k} H_L^T + R_L)^{-1} \quad (6)$$

$$P_k = (I - K_k H_L) P_{k-1,k} \quad (7)$$

$$\delta X_k = \delta X_{k,k-1} + K_k (Z_L - H_L \delta X_{k,k-1}) \quad (8)$$

$$X_k = X_k \oplus \delta X_k \quad (9)$$

where $K_k$ is a filter gain; $\oplus$ represents using the error state variable estimated by the filter to correct the system state variable $X_k$; $R_L$ is a covariance matrix of the LiDAR measurement information; $Z_L$ is LiDAR measurement data; $H_L$ is a LiDAR measurement matrix. A positioning result of the LiDAR comprises location information and course information:

$$Z_L = [\lambda_S \ L_S \ a_S \ h_S]^T - [\lambda_L \ L_L \ a_L \ h_L]^T \qquad (10)$$
$$= H_L \delta X_{k,k-1} + V_L$$

where subscript S represents longitude, latitude, height and course obtained by the first Kalman filter's solving; subscript L represents longitude, latitude, height and course obtained from LiDAR point cloud positioning solving; $V_L$ is an error covariance matrix of the LiDAR point cloud positioning; $H_L$ is a measurement matrix whose measurement information is the LiDAR point cloud positioning.

In a preferred implementation mode of step S13, if measurement data after the measurement time of the measurement data is already buffered, regarding the already-buffered measurement data after the measurement time as current measurement data; performing time update for the second Kalman filter until a measurement time of measurement data after the measurement time of the measurement data, and performing measurement update.

The time update comprises: performing time update for the second Kalman filter according to the IMU data in the buffer until a measurement time of measurement data after the measurement time of the measurement data, comprising: assigning the error state variable of the first Kalman filter to the second Kalman filter, and obtaining, from the buffer of the first Kalman filter, the system state variable at the measurement time of the IMU data.

The measurement update comprises: according to the measurement data after the measurement time of the measurement data, and the system state variable and error state variable obtained by the first Kaman filter's solving, calculating an error state variable of the second Kalman filter to correct the system state variable.

For example, if there is a measurement time t2 of previously-received GNSS measurement data, t2 being later than t1. This situation belongs to disorder of the received measurement data. Since there is a larger time delay in LiDAR point cloud positioning calculation, it usually takes 80-100 ms from collecting the measurement information to solving to obtain the measurement data; as for GNSS, it usually take 10-20 ms from collecting the measurement information to solving to obtain the measurement data. When the LiDAR point cloud positioning is received, the GNSS positioning information at time t2 is already received. Then, it is possible to perform time update for the second Kalman filter according to the IMU data in the buffer and the system state variable of the autonomous vehicle obtained by solving, until t2, and then perform measurement update. Measurement equations at this time are as follows:

$$K_k = P_{k-1,k} H_G (H_G P_{k-1,k} H_G^T + R_G)^{-1} \qquad (6)$$

$$P_k = (I - K_k H_G) P_{k-1,k} \qquad (7)$$

$$\delta X_k = \delta X_{k,k-1} + K_k (Z_G - H_G \delta X_{k,k-1}) \qquad (8)$$

$$X_k = X_k \oplus \delta X_k \qquad (9)$$

where $K_k$ is a filter gain; $\oplus$ represents that the error state variable estimated by the filter corrects the system state variable $X_k$; $R_G$ is a covariance matrix of the GNSS measurement information; $Z_G$ is GNSS measurement data; $H_G$ is a GNSS measurement matrix.

Wherein, the GNSS measurement data is longitude and latitude and height:

$$Z_G = [\lambda_S \ L_S \ a_S]^T - [\lambda_G \ L_G \ a_G]^T \qquad (11)$$
$$= H_G \delta X_{k,k-1} + V_G$$

where subscript S represents obtained by the first Kalman filter's solving; subscript G represents obtained by the GNSS's solving; $V_G$ is an error covariance matrix of the GNSS positioning; $H_G$ is a measurement matrix whose measurement information is the GNSS positioning.

After performing measurement update of the GNSS measurement data at time t2, it is possible to perform time update for the second Kalman filter according to the IMU data until a time of latest IMU data. It is possible to assign the error state variable in the second Kalman filter to the first Kalman filter, and update the state and buffer of the first Kalman filter.

The method further comprises: if there are a plurality of measurement data, performing time update and measurement update for the second Kalman filter in turn, until a time of latest IMU data. It is possible to, after performing time update for the second Kalman filter according to the IMU data until a time of latest IMU data, assign the error state variable in the second Kalman filter to the first Kalman filter, and then enter next cycle.

If measurement data after the measurement time of the measurement data is not yet buffered, it is possible to perform time update for the second Kalman filter according to the IMU data until a time of latest IMU data, and assign the error state variable in the second Kalman filter to the first Kalman filter, and enters next cycle.

Figure 2:
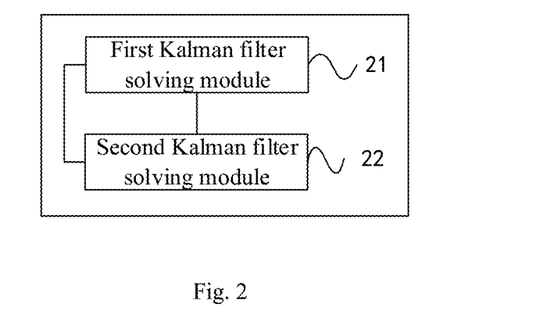
FIG. 2 is a structural schematic diagram of an integrated positioning system according to an embodiment of the present disclosure.

FIG. 2 is a structural schematic diagram of an integrated positioning system according to an embodiment of the present disclosure. As shown in FIG. 2, the integrated positioning system comprises:

a first Kalman filter solving module 21 configured to receive IMU data, and solve for the IMU data in the first Kalman filter to obtain a system state variable of the autonomous vehicle;

a second Kalman filter solving module 22 configured to receive and buffer measurement data, and regard the measurement data as current measurement data, and perform measurement updating: perform measurement update in the second Kalman filter to obtain an updated system state variable;

if measurement data after the measurement time of the measurement data is already buffered, regard the already-buffered measurement data after the measurement time as current measurement data, and perform the measurement update.

In a preferred implementation mode of the first Kalman filter solving module 21, receiving the IMU data which includes output data of an accelerator and a gyro, and solving for the IMU data in the first Kalman filter in real time to obtain a system state variable and an error state variable of the autonomous vehicle; storing in a buffer the IMU data and the system state variable of the autonomous vehicle obtained from the solving.

The system state variable comprises a location r, a velocity $v^n$ and a posture quaternion $q_b^n$.

Preferably, it is feasible to use the following differential equations of the SINS (Strapdown Inertial Navigation System) to solve in real time to obtain the location, velocity and posture quaternion of the autonomous vehicle:

$$\dot{r} = R_c v \quad (1)$$

$$\dot{v}_{en}^n = C_b^n f^b - (2\omega_{ie}^n + \omega_{en}^n) \times v_{en}^n + g^n \quad (2)$$

$$\dot{q}_b^n = 0.5 * q_b^n (\omega_{nb}^b \times) \quad (3)$$

where $r=(\lambda, L, a)^T$, is location information of the autonomous vehicle, and includes longitude $\lambda$, latitude L and height a;

$$R_c = \begin{bmatrix} \frac{1}{(R_n+a)\cos(L)} & \frac{1}{R_m+a} & 1 \end{bmatrix},$$

convert a distance of velocity integration into the longitude $\lambda$, latitude L and height a, and $R_m$ and $R_n$ are a radius of a meridian and a radius of a prime vertical of the globe; $C_b^n$ is a posture matrix, namely, a rotation matrix from a carrier coordinate system to a navigation coordinate system; $\omega_{ie}^n$ is a projection of an earth rotation angular velocity on the navigation coordinate system; $\omega_{en}^n$ is a projection of rotation of the navigation coordinate system relative to the earch coordinate system on the navigation coordinate system; $f^b$ is a specific force measured by the accelerator in the IMU; $g^n$ is a projection of a gravational acceleration on the navigation coordinate system; $\omega_{nb}^b = \omega_{ib}^b - C_n^b(\omega_{ie}^n + \omega_{en}^n)$ is a projection of rotation of the carrier coordinate system relative to the navigation coordinate system on the carrier coordinate system; $\omega_{ib}^b$ is an angular velocity output by the gyro in the IMU.

Meanwhile, using equations (4) and (5) in the first Kalman filter to estimate the error state variable includes a prediction value of the state variable and a covariance of the state variable:

$$\delta \dot{X}_{k,k-1} = F_{k,k-1} \delta X_{k-1} \quad (4)$$

$$P_{k-1,k} = F_{k,k-1} P_{k-1} F_{k,k-1}^T + G_k Q_k G_k^T \quad (5)$$

where $F_{k,k+1}$ is a state transfer matrix of a discrete error state variable $\delta X_k$, and obtained by performing discretization via an error equation of the SINS, and will not be detailed any more here; $\delta X_{k,k-1}$ is a prediction value of the error state variable; $P_{k-1}$ is a covariance matrix of the error state variable $\delta X_{k-1}$; $P_{k-1,k}$ is a prediction value of the covariance; $G_k$ is a noise drive matrix; $Q_k$ is a system noise (including accelerator noise, gyro noise, accelerator zero bias noise, gyro zero bias noise) covariance matrix; when currently no measurement data are subjected to measurement updating, $\delta X_k = \delta X_{k,k-1}$ and $P_k = P_{k-1,k}$.

The IMU data and the system state variable are stored in the buffer of the first Kalman filter, and the buffer has a fixed length which for example may be set as 2s.

Preferably, the above calculation process consumes less than 1 ms. Assuming that a data refresh frequency of the IMU is 200 Hz, a data refresh frequency of the GNSS is 5 Hz, and a data refresh frequency of the LiDAR is 10 Hz, it is possible to obtain GNSS data update twice and IMU data update 20 times between every two times of LiDAR measurement data update.

In a preferred implementation mode of the second Kalman filter solving module 22, receiving first measurement data output by the LiDAR;

storing the first measurement data output by the LiDAR in a buffer of a second Kalman filter;

a time updating submodule configured to perform time update, assign an error state variable in the first Kalman filter to the second Kalman filter, and obtain, from the buffer of the first Kalman filter, a system state variable at measurement time of the first measurement data;

a measurement updating submodule configured to perform measurement update, and calculate an error state variable of the second Kalman filter to correct the system state variable, according to the first measurement data output by the LiDAR, the system state variable and error state variable obtained by the first Kaman filter's solving.

For example, if the measurement time of the first measurement data is t1, it is feasible to assign the error variable estimated by the first Kalman filter to the second Kalman filter, obtain the system state variable at t1 from the buffer of the first Kalman filter, and perform measurement update by regarding the first measurement data and the system state variable at t1 obtained from the buffer of the first Kalman filter as measurement information of the second Kalman filter.

Measurement equations at this time are as follows:

$$K_k = P_{k-1,k} H_L (H_L P_{k-1,k} H_L^T + R_L)^{-1} \quad (6)$$

$$P_k = (I - K_k H_L) P_{k-1,k} \quad (7)$$

$$\delta X_k = \delta X_{k,k-1} + K_k (Z_L - H_L \delta X_{k,k-1}) \quad (8)$$

$$X_k = X_k \oplus \delta X_k \quad (9)$$

where $K_k$ is a filter gain; $\oplus$ represents that the error state variable estimated by the filter corrects the system state variable $X_k$; $R_L$ is a covariance matrix of the LiDAR measurement information; $Z_L$ is LiDAR measurement data; $H_L$ is a LiDAR measurement matrix. A positioning result of the LiDAR comprises location information and course information:

$$Z_L = [\lambda_S \; L_S \; a_S \; h_S]^T - [\lambda_L \; L_L \; a_L \; h_L]^T \quad (10)$$

$$= H_L \delta X_{k,k-1} + V_L$$

where subscript S represents longitude, latitude, height and course obtained by the first Kalman filter's solving; subscript L represents longitude, latitude, height and course obtained from LiDAR point cloud positioning solving; $V_L$ is an error covariance matrix of the LiDAR point cloud positioning; $H_L$ is a measurement matrix whose measurement information is the LiDAR point cloud positioning.

If measurement data after the measurement time of the measurement data is already buffered, regarding the already-buffered measurement data after the measurement time as current measurement data; the time updating submodule performs time update for the second Kalman filter until a measurement time of measurement data after the measurement time of the measurement data, and performs measurement update.

The time updating submodule performs time update for the second Kalman filter according to the IMU data in the buffer until a measurement time of measurement data after the measurement time of the measurement data, comprising: assigning the error state variable of the first Kalman filter to the second Kalman filter, and obtaining, from the buffer of the first Kalman filter, the system state variable at the measurement time of the IMU data.

The measurement updating submodule calculates an error state variable of the second Kalman filter to correct the system state variable, according to the measurement data after the measurement time of the measurement data, and the system state variable and error state variable obtained by the first Kaman filter's solving.

For example, if there is a measurement time t2 of previously-received GNSS measurement data, t2 being later than t1. This situation belongs to disorder of the received measurement data. Since there is a larger time delay in LiDAR point cloud positioning calculation, it usually takes 80-100 ms from collecting the measurement information to solving to obtain the measurement data; as for GNSS, it usually take 10-20 ms from collecting the measurement information to solving to obtain the measurement data. When the LiDAR point cloud positioning is received, the GNSS positioning information at time t2 is already received. Then, it is possible to perform time update for the second Kalman filter according to the IMU data in the buffer and the system state variable of the autonomous vehicle obtained by solving, until t2, and then perform measurement update. Measurement equations at this time are as follows:

$$K_k = P_{k-1,k} H_L (H_L P_{k-1,k} H_L^T + R_L)^{-1} \quad (6)$$

$$P_k = (I - K_k H_L) P_{k-1,k} \quad (7)$$

$$\delta X_k = \delta X_{k,k-1} + K_k (Z_L - H_L \delta X_{k,k-1}) \quad (8)$$

$$X_k = X_k \oplus \delta X_k \quad (9)$$

where $K_k$ is a filter gain; $\oplus$ represents using the error state variable estimated by the filter to correct the system state variable $X_k$; $R_G$ is a covariance matrix of the GNSS measurement information; $Z_G$ is GNSS measurement data; $H_G$ is a GNSS measurement matrix.

Wherein, the GNSS measurement data is longitude and latitude and height:

$$Z_G = [\lambda_S \quad L_S \quad a_S]^T - [\lambda_G \quad L_G \quad a_G]^T \quad (11)$$
$$= H_G \delta X_{k,k-1} + V_G$$

where subscript S represents obtained by the first Kalman filter's solving; subscript G represents obtained by the GNSS's solving; $V_G$ is an error covariance matrix of the GNSS positioning; $H_G$ is a measurement matrix whose measurement information is the GNSS positioning.

After the time updating submodule performs time update for the second Kalman filter until the measurement time t2 of the measurement data after the measurement time of the measurement data, and the measurement updating submodule performs the measurement update, the time updating submodule performs time update for the second Kalman filter according to the IMU data until a time of latest IMU data, and assigns the error state variable in the second Kalman filter to the first Kalman filter.

If there are a plurality of measurement data, it is possible to perform time update and measurement update for the second Kalman filter in turn, until a time of latest IMU data, and assign the error state variable in the second Kalman filter to the first Kalman filter.

If measurement data after the measurement time of the measurement data is not yet buffered, the time updating submodule performs time update for the second Kalman filter according to the IMU data until a time of latest IMU data, and assigns the error state variable in the second Kalman filter to the first Kalman filter, and enters next cycle.

In a preferred embodiment of the present disclosure,

It is assumed that LiDAR measurement data is generated as first measurement data at time t1, and GNSS measurement data is generated as second measurement data at time t2. Since there is a larger time delay in LiDAR point cloud positioning calculation, when the LiDAR measurement data is received at time t4, the GNSS measurement data is already received at time t3. It can be seen that the received measurement data is in disorder. A specific processing process is as follows:

From an initial time to time t3:

Receiving IMU data, the IMU data comprising output data of an accelerator and a gyro, performing real-time solving for the IMU data in the first Kalman filter to obtain the system state variable and error state variable of the autonomous vehicle; storing the IMU data and the system state variable of the autonomous vehicle obtained from solving in the buffer, wherein the system state variable comprises: a location, a velocity and a posture quaternion; the error state variable comprises: a prediction value of the state variable and a covariance of the state variable.

Time t3:

Receiving second measurement data output by the GNSS; storing the second measurement data output by the GNSS in the buffer of the second Kalman filter;

performing time update, comprising: assigning an error state variable in the first Kalman filter to the second Kalman filter, and obtaining, from the buffer of the first Kalman filter, a system state variable at measurement time t2 of the second measurement data;

performing measurement update, comprising: according to the second measurement data output by the GNSS, the system state variable and error state variable obtained by the first Kaman filter's solving, calculating an error state variable of the second Kalman filter to correct the system state variable.

Since the GNSS or LiDAR measurement data is not buffered after time t2, performing time update for the second Kalman filter according to the IMU data in the buffer until a time of latest IMU data, comprising: assigning the error state variable in the first Kalman filter to the second Kalman filter, and obtaining, from the buffer of the first Kalman filter, the system state variable at the measurement time of the IMU data.

assigning the error state variable in the second Kalman filter to the first Kalman filter, and performing update for the state and the buffer of the first Kalman filter.

the first Kalman filter receives the IMU data, the IMU data comprising output data of the accelerator and the gyro, performing real-time solving for the IMU data in the first Kalman filter until time t4 to obtain the system state variable and error state variable of the autonomous vehicle; storing the IMU data and the system state variable of the autonomous vehicle obtained from solving in the buffer, wherein the system state variable comprises: a location, a velocity and a posture quaternion; the error state variable comprises: a prediction value of the state variable and a covariance of the state variable.

Time t4

Receiving first measurement data output by the LiDAR; storing the first measurement data output by the LiDAR in the buffer of the second Kalman filter;

performing time update, comprising: assigning the error state variable in the first Kalman filter to the second Kalman filter, and obtaining, from the buffer of the first Kalman filter, a system state variable at measurement time t1 of the first measurement data;

performing measurement update, comprising: according to the first measurement data output by the LiDAR, the system state variable and error state variable obtained by the first Kaman filter's solving, calculating an error state variable of the second Kalman filter to correct the system state variable.

Since the second measurement data output by the GNSS is already buffered, and its measurement time is time t2 which is later than the measurement time t1 of the first measurement data, performing time update for the second Kalman filter according to the IMU data in the buffer until time t2, comprising: assigning the error state variable in the first Kalman filter to the second Kalman filter, and obtaining, from the buffer of the first Kalman filter, a system state variable at measurement time of the IMU data;

performing measurement update, comprising: according to the second measurement data output by the GNSS, the system state variable and error state variable obtained by the first Kaman filter's solving, calculating an error state variable of the second Kalman filter to correct the system state variable.

performing time update for the second Kalman filter according to the IMU data in the buffer until a latest IMU time, comprising: assigning the error state variable in the first Kalman filter to the second Kalman filter, and obtaining, from the buffer of the first Kalman filter, the system state variable at the measurement time of the IMU data.

Assigning the error state variable in the second Kalman filter to the first Kalman filter, and performing update for the state and the buffer of the first Kalman filter.

Receiving IMU data, the IMU data comprising output data of an accelerator and a gyro, performing real-time solving for the IMU data in the first Kalman filter to obtain the system state variable and error state variable of the autonomous vehicle; storing the IMU data and the system state variable of the autonomous vehicle obtained from solving in the buffer, wherein the system state variable comprises: a location, a velocity and a posture quaternion; the error state variable comprises: a prediction value of the state variable and a covariance of the state variable.

In a preferred mode of the present embodiment, at time t5, receiving third measurement data; storing the third measurement data in the buffer of the second Kalman filter;

performing time update, comprising: assigning an error state variable in the first Kalman filter to the second Kalman filter, and obtaining, from the buffer of the first Kalman filter, a system state variable at measurement time t;

performing measurement update, comprising: according to the third measurement data, the system state variable and error state variable obtained by the first Kaman filter's solving, calculating an error state variable of the second Kalman filter to correct the system state variable.

If the measurement time t of the measurement data received at time t5 is later than time t2, performing time update for the second Kalman filter according to the IMU data in the buffer until the latest IMU time, comprising: assigning the error state variable in the first Kalman filter to the second Kalman filter, and obtaining, from the buffer of the first Kalman filter, a system state variable at measurement time of the IMU data;

assigning the error state variable in the second Kalman filter to the first Kalman filter, and performing update for the state and the buffer of the first Kalman filter.

If the measurement time t of the measurement data received at time t5 is prior to time t1, That is, the first measurement data output by the LiDAR is already buffered, and its measurement time is time t1 which is later than the measurement time t; furthermore, the second measurement data output by the GNSS is already buffered, and its measurement time is time t2 which is later than the measurement times t and t1. Therefore, it is possible to, after performing measurement update of t, perform time update, measurement update of t1, time update, measurement update of t2, and time update in turn until the latest IMU time. It is feasible to assign the error state variable in the second Kalman filter to the first Kalman filter, and perform update for the state and buffer of the first Kalman filter.

if the measurement time of the measurement data received at time t5 is between t1 and t2, the second measurement data output by the GNSS is already buffered, and its measurement time is time t2 and later than the measurement time t. Hence, it is possible to, after performing measurement update of t, perform time update, measurement update of t2 and time update in turn until the latest IMU time. It is feasible to assign the error state variable in the second Kalman filter to the first Kalman filter, and perform update for the state and buffer of the first Kalman filter.

The technical solutions of the above embodiments may be employed to solve the problem that the measurement information is disordered during data integration of multiple sensors such as IMU, GNSS and LiDAR for positioning, and improve real time and accuracy of the positioning.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above is introduction of the method embodiment. The solution of the present disclosure will be further described through an apparatus embodiment.

In the above embodiments, different emphasis is placed on respective embodiments, and reference may be made to related depictions in other embodiments for portions not detailed in a certain embodiment.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be integrated or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
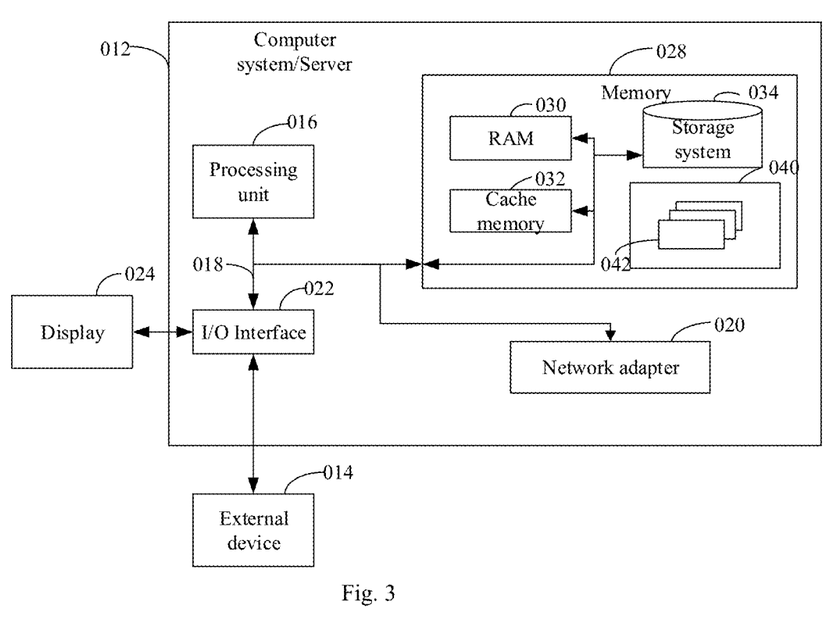
FIG. 3 illustrates a block diagram of an example computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the system memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A computer-implemented integrated positioning method for an autonomous vehicle, wherein the method comprises:
   receiving IMU data of the autonomous vehicle, and solving using the IMU data in a first Kalman filter to obtain a system state variable of the autonomous vehicle;
   receiving and buffering measurement data, and regarding the measurement data as current measurement data;
   performing measurement updating: obtaining the system state variable at a measurement time of current measurement data, and solving in a second Kalman filter to obtain an updated system state variable;
   if measurement data after the measurement time of the measurement data is already buffered, regarding the already-buffered measurement data after the measurement time as current measurement data, and performing the measurement update for positioning the autonomous vehicle,
   wherein said performing the measurement update comprises:
   performing time update for the second Kalman filter until a measurement time of measurement data after the measurement time of the measurement data, and performing measurement update.

2. The computer-implemented method according to claim 1, wherein the receiving IMU data, and solving using the IMU data in a first Kalman filter to obtain a system state variable of an autonomous vehicle comprises:
   receiving the IMU data, and solving using the IMU data in the first Kalman filter to obtain a system state variable and an error state variable of the autonomous vehicle; storing in a buffer the IMU data and the system state variable of the autonomous vehicle obtained from the solving.

3. The computer-implemented method according to claim 2, wherein the performing the measurement update comprises:
   performing time update, assigning an error state variable in the first Kalman filter to the second Kalman filter, and obtaining, from the buffer of the first Kalman filter, the system state variable at the measurement time of the current measurement data;
   performing measurement update, comprising: calculating an error state variable of the second Kalman filter to correct the system state variable, according to the current measurement data, and the system state variable and error state variable obtained by the first Kaman filter's solving.

4. The computer-implemented method according to claim 1, wherein the performing time update for the second Kalman filter until a measurement time of measurement data after the measurement time of the measurement data, and performing measurement update further comprises:
   if there are a plurality of measurement data, performing time update and measurement update for the second Kalman filter in turn, until a time of latest IMU data.

5. The computer-implemented method according to claim 1, wherein after step of, if measurement data after the measurement time of the measurement data is already buffered, regarding the already-buffered measurement data after the measurement time as current measurement data, and performing the measurement update, the method further comprises:
   performing time update for the second Kalman filter until a time of latest IMU data, and assigning the error state variable in the second Kalman filter to the first Kalman filter.

6. The computer-implemented method according to claim 1, wherein the measurement data is GNSS or LiDAR measurement data.

7. A computer device, comprising a memory, a processor and a computer program which is stored on the memory and runnable on the processor, wherein the processor, upon executing the program, implements an integrated positioning method for an autonomous vehicle, wherein the method comprises:
   receiving IMU data of the autonomous vehicle, and solving using the IMU data in a first Kalman filter to obtain a system state variable of the autonomous vehicle;
   receiving and buffering measurement data, and regarding the measurement data as current measurement data;
   performing measurement updating: obtaining the system state variable at a measurement time of current measurement data, and solving in a second Kalman filter to obtain an updated system state variable;
   if measurement data after the measurement time of the measurement data is already buffered, regarding the already-buffered measurement data after the measurement time as current measurement data, and performing the measurement update for positioning the autonomous vehicle, wherein said performing the measurement update comprises:
performing time update for the second Kalman filter until a measurement time of measurement data after the measurement time of the measurement data, and performing measurement update.

8. The computer device according to claim 7, wherein the receiving IMU data, and solving the IMU data in a first Kalman filter to obtain a system state variable of an autonomous vehicle comprises:
receiving the IMU data, and solving using the IMU data in the first Kalman filter to obtain a system state variable and an error state variable of the autonomous vehicle; storing in a buffer the IMU data and the system state variable of the autonomous vehicle obtained from the solving.

9. The computer device according to claim 8, wherein the performing the measurement update comprises:
performing time update, assigning an error state variable in the first Kalman filter to the second Kalman filter, and obtaining, from the buffer of the first Kalman filter, the system state variable at the measurement time of the current measurement data;
performing measurement update, comprising: calculating an error state variable of the second Kalman filter to correct the system state variable, according to the current measurement data, and the system state variable and error state variable obtained by the first Kaman filter's solving.

10. The computer device according to claimer 7, wherein the performing time update for the second Kalman filter until a measurement time of measurement data after the measurement time of the measurement data, and performing measurement update further comprises:
if there are a plurality of measurement data, performing time update and measurement update for the second Kalman filter in turn, until a time of latest IMU data.

11. The computer device according to claim 7, wherein after step of, if measurement data after the measurement time of the measurement data is already buffered, regarding the already-buffered measurement data after the measurement time as current measurement data, and performing the measurement update, the method further comprises:
performing time update for the second Kalman filter until a time of latest IMU data, and assigning the error state variable in the second Kalman filter to the first Kalman filter.

12. The computer device according to claim 7, wherein the measurement data is GNSS or LiDAR measurement data.

13. A non-transitory computer-readable storage medium on which a computer program is stored, wherein the program, when executed by a processor, implements an integrated positioning method, wherein the method comprises:
receiving IMU data of the autonomous vehicle, and solving using the IMU data in a first Kalman filter to obtain a system state variable of the autonomous vehicle;
receiving and buffering measurement data, and regarding the measurement data as current measurement data;
performing measurement updating: obtaining the system state variable at a measurement time of current measurement data, and solving in a second Kalman filter to obtain an updated system state variable;
if measurement data after the measurement time of the measurement data is already buffered, regarding the already-buffered measurement data after the measurement time as current measurement data, and performing the measurement update for positioning the autonomous vehicle,
wherein said performing the measurement update comprises:
performing time update for the second Kalman filter until a measurement time of measurement data after the measurement time of the measurement data, and performing measurement update.

14. The non-transitory computer-readable storage medium according to claim 13, wherein the receiving IMU data, and solving using the IMU data in a first Kalman filter to obtain a system state variable of an autonomous vehicle comprises:
receiving the IMU data, and solving using the IMU data in the first Kalman filter to obtain a system state variable and an error state variable of the autonomous vehicle; storing in a buffer the IMU data and the system state variable of the autonomous vehicle obtained from the solving.

15. The non-transitory computer-readable storage medium according to claim 14, wherein the performing the measurement update comprises:
performing time update, assigning an error state variable in the first Kalman filter to the second Kalman filter, and obtaining, from the buffer of the first Kalman filter, the system state variable at the measurement time of the current measurement data;
performing measurement update, comprising: calculating an error state variable of the second Kalman filter to correct the system state variable, according to the current measurement data, and the system state variable and error state variable obtained by the first Kaman filter's solving.

16. The non-transitory computer-readable storage medium according to claim 13, wherein the performing time update for the second Kalman filter until a measurement time of measurement data after the measurement time of the measurement data, and performing measurement update further comprises:
if there are a plurality of measurement data, performing time update and measurement update for the second Kalman filter in turn, until a time of latest IMU data.

17. The non-transitory computer-readable storage medium according to claim 13, wherein after step of, if measurement data after the measurement time of the measurement data is already buffered, regarding the already-buffered measurement data after the measurement time as current measurement data, and performing the measurement update, the method further comprises:
performing time update for the second Kalman filter until a time of latest IMU data, and assigning the error state variable in the second Kalman filter to the first Kalman filter.

* * * * *